(12) United States Patent
Scolamiero et al.

(10) Patent No.: US 9,815,574 B2
(45) Date of Patent: Nov. 14, 2017

(54) DEPLOYABLE TENSEGRITY STRUCTURE, ESPECIALLY FOR SPACE APPLICATIONS

(75) Inventors: Lucio Gerardo Scolamiero, Wassenaar (NL); Valfredo Zolesi, Livomo (IT); Pier Luigi Ganga, Pisa (IT); Paolo Podio-Guidugli, Roma (IT); Gunnar Tibert, Danderyd (SE); Andrea Micheletti, Roma (IT)

(73) Assignee: AGENCE SPATIALE EUROPEENNE, Paris (FR)

( * ) Notice: Subject to any disclaimer, the term of this patent is extended or adjusted under 35 U.S.C. 154(b) by 487 days.

(21) Appl. No.: 14/386,095

(22) PCT Filed: Mar. 19, 2012

(86) PCT No.: PCT/IB2012/051309
§ 371 (c)(1),
(2), (4) Date: Feb. 2, 2015

(87) PCT Pub. No.: WO2013/140201
PCT Pub. Date: Sep. 26, 2013

(65) Prior Publication Data
US 2015/0151854 A1    Jun. 4, 2015

(51) Int. Cl.
*B64G 1/22* (2006.01)
*H01Q 1/28* (2006.01)
*H01Q 15/16* (2006.01)

(52) U.S. Cl.
CPC ............. *B64G 1/222* (2013.01); *H01Q 1/288* (2013.01); *H01Q 15/161* (2013.01)

(58) Field of Classification Search
CPC .. B64G 1/222; B64G 2001/224; H01Q 1/288; H01Q 15/161; H01Q 1/08; H01Q 1/1235; H01Q 1/084; H01Q 3/02
See application file for complete search history.

(56) References Cited

U.S. PATENT DOCUMENTS 5,680,145 A * 10/1997 Thomson ................. F24J 2/125
  343/840
5,990,851 A * 11/1999 Henderson ............. H01Q 1/081
  343/840

(Continued)

FOREIGN PATENT DOCUMENTS

WO            02/101880         12/2002

Primary Examiner — Assres H Woldemaryam
(74) Attorney, Agent, or Firm — Clark & Brody

(57) ABSTRACT

A deployable structure comprises a first and second flexible tension members respectively defining a first and second contours of a ring. A first plurality of rigid compression members extends between the first and second contours. Only one end of each first plurality compression member is mounted on the first contour. A second plurality of rigid compression members extends between the first and second contours. Only one end of each second plurality compression member is mounted on the second contour. The first and second plurality of compression members are arranged with a repetitive crossing pattern around the ring. A first plurality of flexible tension members link each end of a compression member mounted on one of said contours to an end of another non-mounted compression member and a second plurality of flexible tension members link each end of a non-mounted compression member to an end of another non-mounted compression member.

15 Claims, 5 Drawing Sheets

(56) References Cited

U.S. PATENT DOCUMENTS

| | | | |
|---|---|---|---|
| 6,225,965 B1* | 5/2001 | Gilger | H01Q 1/288 343/912 |
| 6,278,416 B1* | 8/2001 | Harless | F24J 2/125 343/840 |
| 6,441,801 B1 | 8/2002 | Knight et al. | |
| 6,542,132 B2 | 4/2003 | Stern | |
| 6,618,025 B2* | 9/2003 | Harless | B64G 1/222 343/912 |
| 7,686,255 B2* | 3/2010 | Harris | B64G 1/222 244/159.4 |
| 7,748,376 B2* | 7/2010 | Bender | F24J 2/4638 126/685 |
| 8,474,760 B2* | 7/2013 | Leventhal | F16M 13/00 244/159.4 |
| 8,839,585 B2* | 9/2014 | Prowald | B64G 1/222 52/646 |
| 9,153,860 B2* | 10/2015 | Tserodze | F24J 2/523 |
| 2002/0190918 A1* | 12/2002 | Stern | H01Q 15/161 343/912 |
| 2004/0261351 A1 | 12/2004 | Ung et al. | |
| 2007/0200789 A1* | 8/2007 | Bassily | H01Q 15/161 343/915 |
| 2011/0162294 A1* | 7/2011 | Li | E04B 7/14 52/83 |
| 2015/0303582 A1* | 10/2015 | Meschini | B64G 1/222 343/840 |
| 2015/0351548 A1* | 12/2015 | Schiraga | A47C 4/04 297/452.1 |

\* cited by examiner

DEPLOYABLE TENSEGRITY STRUCTURE, ESPECIALLY FOR SPACE APPLICATIONS

FIELD OF THE INVENTION

The invention relates to a structure which is deployable from a folded state to a deployed state.

The invention more particularly relates to a deployable tensegrity structure.

BACKGROUND ART

Tensegrity is a structural principle based on the use of isolated components, such as rigid bars or struts (in compression), linked together by a continuous net of cables or tendons (in tension), in such a way that the rigid bars or struts do not touch each other.

The distribution of compression and tension forces within the structure is such that a tensegrity structure takes and maintains its shape without any direct contact or joint between the different rigid bars or struts.

Tensegrity structures may be deployable or not according to the technical field to which they pertain.

In the space industry, a deployable reflector with a tensegrity support has already been proposed in U.S. Pat. No. 6,542,132.

An advantage to use a tensegrity structure for such a deployable reflector is to diminish the risk of failure of the deployment. Indeed, in non-tensegrity structures, the joints between two rigid bars or struts raise the failure risks.

However, the quoted document proposes a prismatic structure wherein rigid bars extend from the periphery towards the centre.

Consequently, the rigid bars are quite long and, in practice, can hardly be stowed within the envelope of typical space launchers, even in the case of small scale structures.

Moreover, since the proposed prismatic structure is not symmetric with respect to any plane, perpendicular to the longitudinal axis of the structure, the stability of the structure in orbit is not optimal.

To the applicant's knowledge, this structure has not been used to date.

Former deployable structures do not present the drawbacks of the tensegrity structure proposed in U.S. Pat. No. 6,542,132.

In facts, these former deployable structures can be stowed within the envelope of typical space launchers and are also stable in orbit.

Such a deployable structure is proposed in U.S. Pat. No. 5,680,145. It is well-known to the experts in the field under the name "Astromesh".

The "Astromesh" is composed of a ring-shaped support structure around a longitudinal axis which includes a series of upper rigid contour elements and lower contour elements which, when connected end-to-end, form an upper contour and a lower contour, kept separated by a number of vertical rigid struts.

This support structure allows obtaining a deployable structure which is substantially symmetric with respect to a transversal plane, perpendicular to the longitudinal axis (axis of symmetry) of the support structure itself. A good stability in orbit may thus be obtained.

However, the "Astromesh" structure is not a tensegrity structure, as the contour elements in the upper and lower rigid contour sequences are mounted with each other through joints without which the structure could not be stowed in the space launcher. Moreover, the vertical rigid struts are also mounted through rigid connecting members to said contour elements.

Consequently, the risk of failure of deployment is non-negligible.

Moreover, the number of rigid parts (contour elements and struts) increases the weight of the support structure, whereas it is preferable to have a low mass structure for a space launcher.

SUMMARY OF THE INVENTION

An aim of the invention is to propose an improved tensegrity structure which is deployable from a folded state to a deployed state.

To reach this aim, the invention proposes a deployable tensegrity structure comprising, in the deployed state, a support structure having a ring shape around a longitudinal axis and comprising:
  a first flexible tension member defining a first contour of said ring and a second flexible tension member defining a second contour of said ring;
  a first plurality of rigid compression members extending between said first and second contours, one end of each rigid compression member of the first plurality being mounted on the first contour whereas the other end is not mounted on a contour and; a second plurality of rigid compression members extending between said first and second contours, one end of each rigid compression member of the second plurality being mounted on the second contour whereas the other end is not mounted on a contour; said first and second plurality of rigid compression members being arranged with a repetitive crossing pattern around the ring;
  a first plurality of flexible tension members linking each end of a compression member mounted on one of said contours to an end of another compression member which is not mounted on one of said contours and, a second plurality of flexible tension members linking each end of a compression member which is not is mounted on a contour to an end of another compression member which is also not mounted on a contour.

The structure may also have the following technical features, alone or in combination:
  the first plurality of flexible tensions members comprises first flexible tension members which link rigid compression members belonging to the same first or second plurality of rigid compression members;
  the first plurality of flexible tension members comprises second flexible tension members which link rigid compression members of the first plurality to rigid compression members of the second plurality;
  the second plurality of flexible tension members link rigid compression members of the first plurality to compression members of the second plurality;
  several rigid compression members comprise a means, such as a spring, for varying the length of at least one flexible tension member;
  several rigid compression members comprise a device for locking at least one flexible tension member;
  two flexible nets are mounted all around a respective contour of the support structure, said nets being linked together by a plurality of linking members so that the nets have both a concave shape and are disposed symmetrically with respect to a transversal symmetric plane of the support structure;
  the rigid compression members are bars or struts;

the flexible tension members are cables or tendons;
it is provided a plurality of active actuators for pre-tensioning the support structure to a required value;
it is provided three active actuators for pre-tensioning the support structure, said actuators being distributed at regular intervals around the longitudinal axis of said support structure.

The invention also proposes a combination of a deployable tensegrity structure according to one the invention with a device comprising a plate intended to be mounted on a boom of a spacecraft and a plurality of bars which first ends are hinged on the plate and which second ends comprise revolute joints mounted on respective ends of rigid compression members of the support structure.

This combination may also be such that two bars of said plurality of bars are mounted on ends of rigid compression members which are themselves mounted on a contour, a third bar of said plurality of bars being mounted on an end of another rigid compression member itself mounted on the other contour.

Alternatively, the invention proposes another combination of a deployable tensegrity structure according to one the invention with a boom of a spacecraft, said boom comprising a central trunk and three branches which are fixed on the central trunk and arranged at regular intervals around the longitudinal axis of the trunk, said branches being intended to be hinged on ends of rigid compression members of the support structure.

The structure according to the invention is particularly convenient for space applications. However, some of these features make it also well adapted for non-space applications, as it will be described hereinafter.

BRIEF DESCRIPTION OF THE DRAWINGS

The invention shall be better understood, and other aims, advantages and features will appear by reading the following description, written with reference to the accompanying drawings, on which.

DETAILED DESCRIPTION OF THE INVENTION

Figure 1:
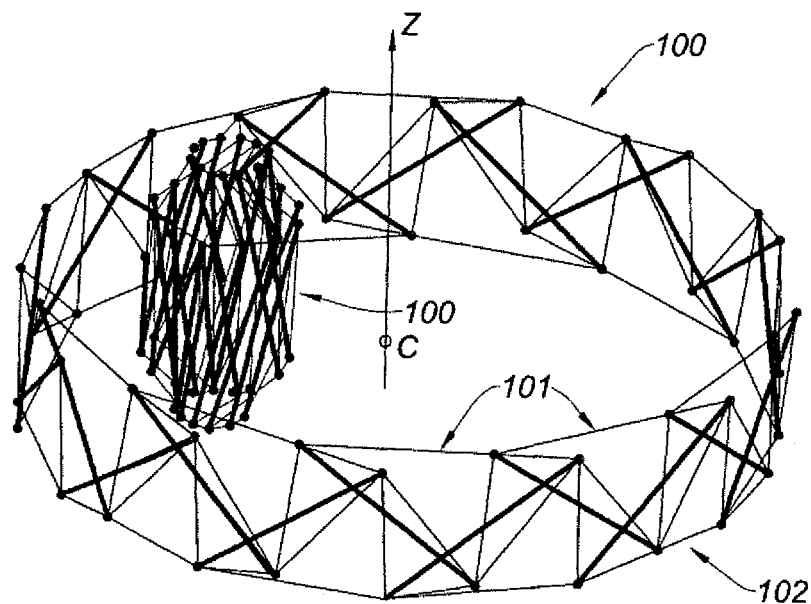
FIG. 1 is a perspective view of a support structure of a deployable tensegrity structure according to the invention, showing said support structure both in the folded state and in the deployed state.
Figure 2:
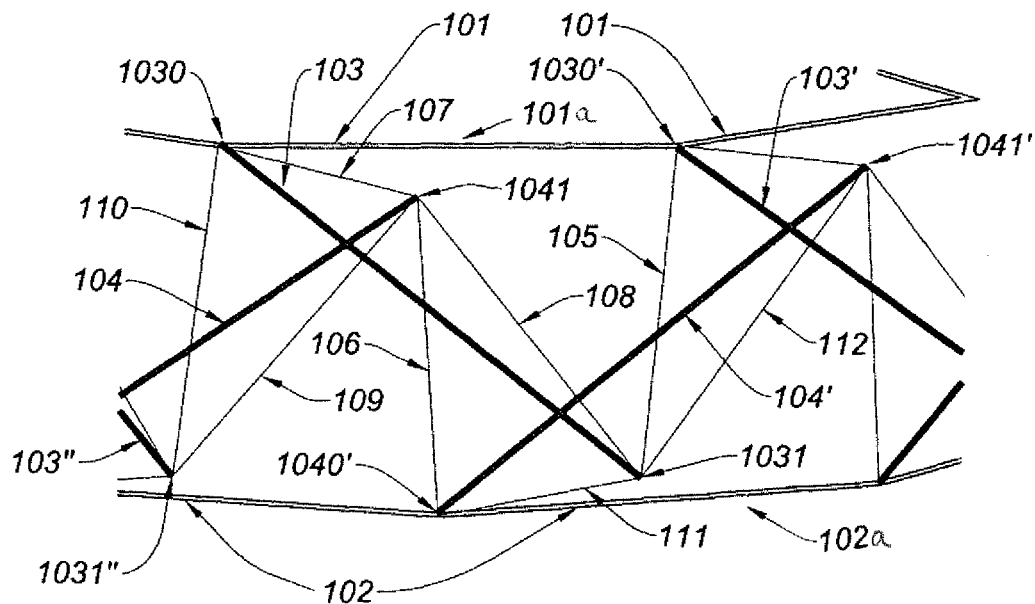
FIG. 2 is a close-up view of FIG. 1 only showing the support structure in the deployed state.

The support structure 100 is shown in FIG. 1, both in a folded state and in a deployed state and in a close-up view in FIG. 2 in its deployed state.

The folded state corresponds to the state of the structure when it is stowed in the launch vehicle. The deployed state corresponds to the state of the structure when it is in operation.

The deployed support structure 100 has a ring shape which longitudinal axis Z passes through its geometric centre C.

The deployed support structure 100a has a ring shape which longitudinal axis Z passes through its geometric centre C.

It also comprises a second flexible tension member 102a defining a second (lower) contour of said ring.

As the support structure 100 has the shape of a ring, it is understood that the contours 101, 102 have similar diameters when the structure 100 is in the deployed state.

The flexible tension members 101a, 102a may be cables or tendons. Moreover, each tension member 101a, 102a may be composed of one single cable/tendon or of a plurality of cables/tendons disposed in series in order to form said contour.

The flexible tension members 101a, 102a are inextensible, that is to say that they do not vary in length.

Tension members 101a, 102a can be coiled at one side of the ring to achieve the stowed configuration 100 shown in FIG. 1.

Coiling can be simply achieved by motorized pulley system.

In the stowed configuration of FIG. 1, adequate amount of elastic energy is stored into compression springs housed in rigid compression members. It will be further discussed hereinafter with FIG. 5.

By un-coiling tensions members 101a, 102a in a controlled way, the elastic energy stored in said compression members can be released gradually, as such obtaining a progressive and controlled deployment of the tensegrity structure as shown in FIG. 1.

Moreover, the support structure 100 comprises a plurality of rigid compression members 103, 103', 104, 104' extending between said first and second contours 101, 102.

These rigid compression members may be bars or struts.

One end 1030, 1030', 1040' of each rigid compression member 103, 103', 104' is mounted on one of said two contours 101, 102, whereas the other end 1031, 1041, 1041' is not mounted on a contour.

Additionally, the support structure 100 comprises a plurality of flexible tension members 105, 106, 107, 110, 111, 108, 109, 112 which link the rigid compression member with each other.

These flexible tensions members 105, 106, 107, 110, 111, 108, 109, 112 may be separated in two types.

The first type of flexible tensions members 105, 106, 107, 110, 111 links each end 1030, 1030', 1040' of a compression member mounted on one of said contours 101, 102 to an end of another compression member which is not mounted on one of said contours.

The second type of flexible tension members 108, 109, 112 links each end 1031, 1031'', 1041, 1041' of a compression member which is not mounted on a contour to an end of another compression member which is also not mounted on a contour.

These flexible tension members may be cables or tendons.

The compression members 103, 104, 103', 104' may also be separated in two types, whether they are mounted on the first contour 101 or on the second contour 102.

The compression members of the same type are preferably identical. Additionally, all the compression members of the support structure 100 are advantageously identical.

The first type of compression members 103, 103' is mounted on the first (upper) contour 101 by one respective end 1030, 1030'. The distance between two successive compression members 1030, 1030' of the first type is the same so that said these compression members 103, 103' form a repetitive pattern.

This is possible because a compression member 103' is mounted on the first (upper) contour 101 by a first end 1030' and the preceding compression member 103 is maintained in position with respect to the following compression member 103' by its second end 1031 to, on the one hand, the first end 1030' of the following compression member 103' and to, on the other hand, the first end 1040' of another compression member 104 (of the second type) by means of a respective flexible tension member 105, 111.

Accordingly, two flexible tension members 105, 111 are necessary to maintain the end 1031 of the rigid compression member 103, which is not mounted on a contour 101, 102, in position with respect to the ends 1030', 1040' of the rigid compression members 103', 104', which ends 1030', 1040' are both mounted on a contour 101, 102.

It should be noted that the flexible tension members 105, 111 are both of the first type.

Moreover, the flexible tension member 105, shown in FIG. 2, is in the present case a substantially vertical cable and the flexible tension member 111, also shown in FIG. 2, is a cable, named diagonal cable.

The vertical cable 105 links two successive compression members 103, 103' of the same type whereas the diagonal cable 111 links two compression members 103, 104' of different types.

The second type of rigid compression members 104, 104' is mounted on the second (lower) contour 102 by one respective end 1040'. The distance between two successive rigid compression members 104, 104' of the second type is the same so that these compression members 104, 104 also form a repetitive pattern.

This is possible because a compression member 104' is mounted on the second (lower) contour 102 by a first end 1040' and the preceding compression member 104 is maintained in position with respect to the following compression member 104' by its second end 1041 to the first end 1040' of the following compression member 104' and to the first end 1030 of the compression member 103 by means of a respective flexible tension member 106, 107.

Once again, two flexible tension members 106, 107 are necessary to maintain the end 1041 of the rigid compression member 104, which is not mounted on a contour 101, 102, in position with respect to the ends, of the rigid compression members, which ends 1030, 1040' are both mounted on a contour 101, 102.

It should be noted that the flexible tension members 106, 107 are both of the first type.

The flexible tension member 106, shown in FIG. 2, is in the present case a substantially vertical cable and the flexible tension member 107, also shown in FIG. 2, is a diagonal cable.

The flexible tension members 107, 106, 111, 105 form a repetitive pattern around the ring.

To guarantee the stability of the support structure 100 when it is deployed, other flexible members 108, 112 are added between the second end 1041, 1041' of compression members 104, 104' of the second type and the second end 1031 of a compression member 103 of the first type. These additional flexible tension members link two ends which are not mounted on the contours 101, 102.

It should be noted that these additional flexible tension members 108, 112 are of the second type, so that they link ends of compression members which are not mounted on a contour 101, 102.

These additional flexible members may be cables, named saddle cables, or tendons.

Similarly, the flexible members 108, 109 link the second end 1041 of a compression member 104 of the second type and the respective second ends 1031, 1031" of two compression members 103, 103" of the first type.

Once again, the additional flexible member 109 may be a cable, named saddle cable, or a tendon.

The links between the different compression members 103, 103', 104, 104' are advantageously made between the closest compression members, as shown in FIG. 2.

The flexible tension members 108, 109, 112 of the second type also define a repetitive pattern around the ring.

Moreover, rigid compression members of both types are arranged with a repetitive crossing pattern all around the ring. As the support structure 100 is a tensegrity structure, there is no mechanical connection between any two compression members: they are disposed in a crossing pattern but they maintain a non-null clearance between them.

The support structure 100 described here above is fully compatible with the installation of two flexible nets 201, 202 which are each mounted all around one of contours 101, 102 of the support structure 100.

Figure 3:
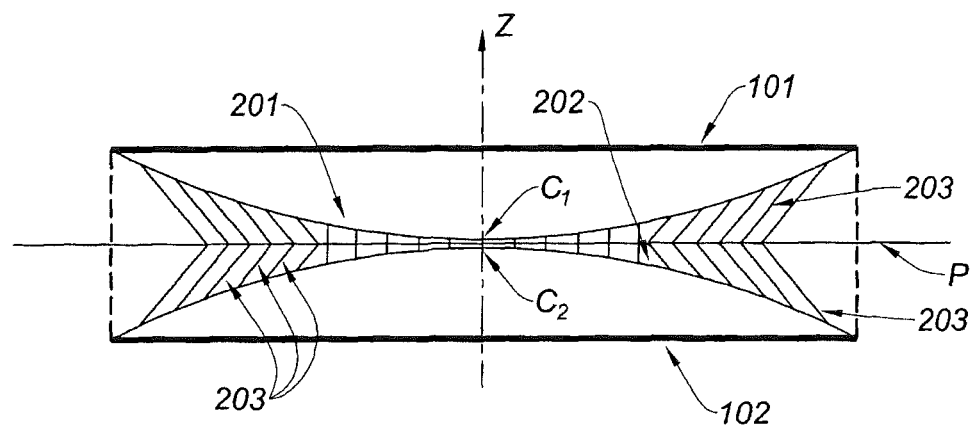
FIG. 3 is a schematic view of a generic embodiment of a tensegrity deployable structure according to the invention, further comprising two opposite flexible tension member nets, one of which intended to support an electromagnetic wave reflector (not shown in the picture)

FIG. 3 shows the two opposite flexible nets 201, 202, together with a plurality of linking members 203 in an embodiment representative of a possible flight hardware configuration.

In this figure, the rigid compression bars 103, 104, 103', 104', 103" and their flexible links are not represented.

Thanks to the linking members 203, each net 201, 202 has a concave shape. In that way, one of the nets 201, 202 may support an electromagnetic wave reflector (not shown in the figure).

As shown in this figure, the nets 201, 202 are mounted in such a way that they are disposed symmetrically with respect to a transversal symmetric plane P of the support structure 100.

Figure 4:
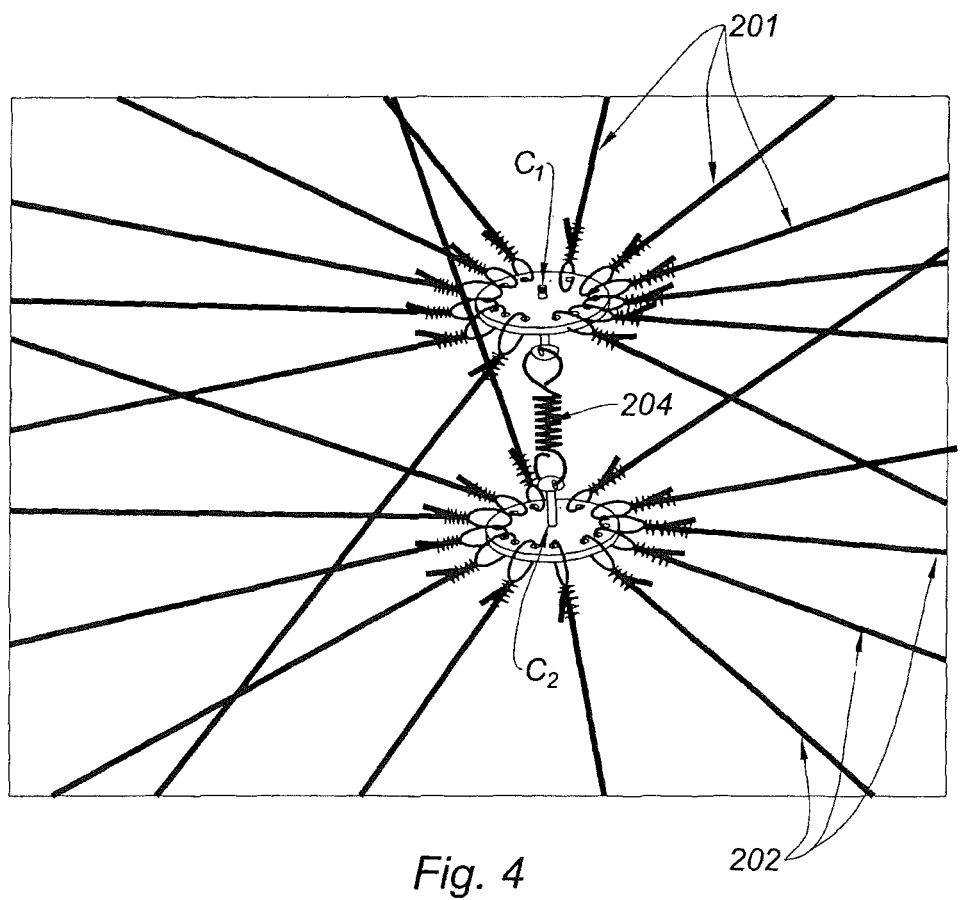
FIG. 4 is a close-up view of two opposite flexible nets, such as that one shown in FIG. 3, at the level of the centre of the flexible cable nets.

FIG. 4 more specifically shows a close-up view of the centre of the nets 201, 202. Actually, it has to be noticed that FIG. 4 represents an embodiment related to a particular realisation of a tensegrity structure prototype, for which only the mechanical characteristics of the said flexible nets and linking members had to be represented.

However, the design shown in FIG. 3 is consistent with FIG. 4.

The centre $C_1$, $C_2$ of each net 201, 202 belongs to the longitudinal axis Z of the ring (axis of symmetry). These centres are preferably linked by an attachment means 204.

The deployment of the structure from its folded state to its deployed state is advantageously realised with the two following phases.

In the first phase, the full deployment of the support structure is achieved by means of a spring 113 based actuation, housed in a compression member 103. By releasing its energy, the spring 113 allows deploying the support structure 100 from its folded state to its deployed state.

It assumes that the spring 113 is initially compressed to store energy when the support structure 100 is in a folded state.

During deployment, a flexible tension member 110 partially housed in the rigid compression member 103 gets in the rigid compression member 103. Accordingly, the length of the flexible tension member 110 outside the rigid compression member 103 decreases.

Once the support structure 100 is deployed, a latching device 112 also housed in said rigid compression member 103 locks the flexible tension member 110 in its final position.

It avoids loosening of tension after deployment.

Figure 5:
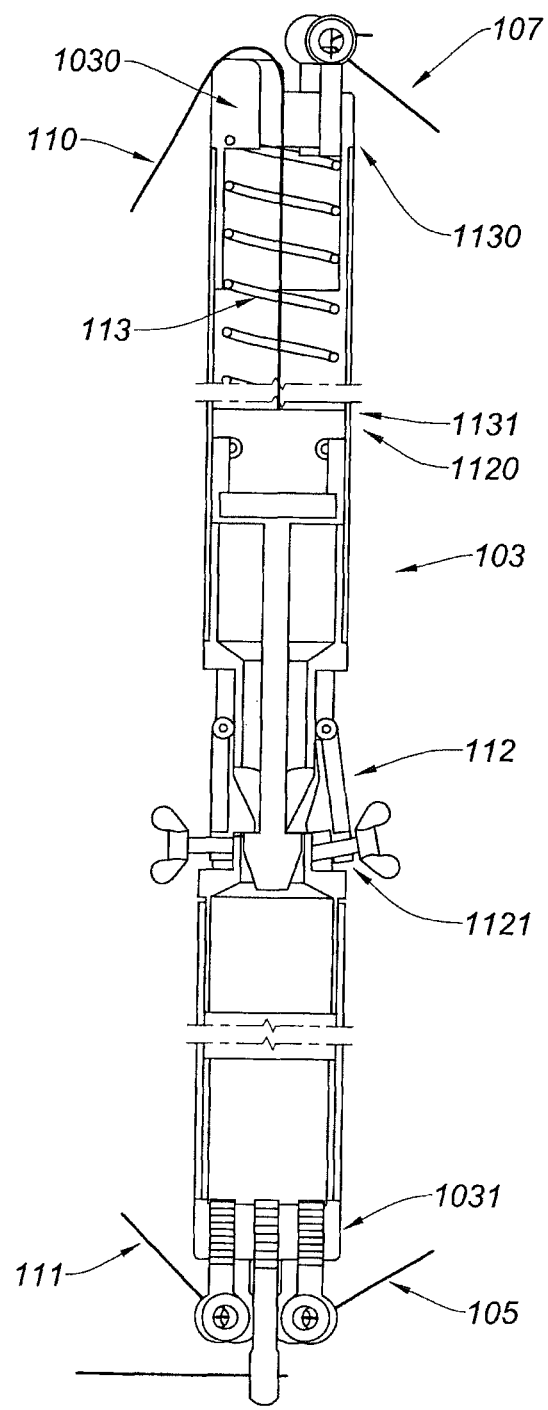
FIG. 5 is a cut-off vertical view of a compression member, used in the support structure shown in FIGS. 1 and 2.

The means employed for the first deployment phase are more specifically shown in FIG. 5. FIG. 5 is a cut-off vertical view of one compression member, in that case the compression member 103 shown in FIG. 2.

The flexible tension member which is chosen to this end is a vertical cable 110. However, it may be carried out with another flexible tension member, such as a diagonal cable of the support structure 100.

The compression member 103 houses the spring 113, which one end 1130 is mated to the casing of the compression member 103 and which other end 1131 is mated to the upper part 1120 of the locking device 112.

The lower part 1121 of the locking device 112 locks the vertical cable 110. The device 112 is in an unlocked position when the support structure is in a folded state. When full deployment is achieved it is locked to avoid loosening of tension.

FIG. 5 also shows the other vertical cable 105 which is linked to the compression member 103'. The length of the visible part of the vertical cable 105 may also vary in length by a corresponding device (spring, locking device) housed in the compression member 103', pursuant to the design shown in FIG. 5.

Moreover, FIG. 5 also shows the diagonal cables 107, 111 which respectively link said compression member 103 to the compression members 104, 104'.

Advantageously, all the compression members of the support structure 100 will include an internal design described with FIG. 5 as, in that case, the risk of failure of deployment is limited.

However, we may also select some rigid compression members among all the rigid compression members contained in the support structure.

In the second phase of deployment of the support structure 100, an active actuation is applied to one or several flexible tension members of the support structure 100 to reach a required pre-tensioned state.

This second phase guarantees stiffness and stability of the deployed support structure 100. It also ensures proper tensioning of the two flexible nets 201, 202 which have to support the electromagnetic reflector. Indeed, the stability of the shape of the reflector has to be maintained during the operational life of the reflector.

Active actuation is carried out by actuators which will be powered by the spacecraft.

Due to the specific features of tensegrity structures, a limited number of actuators is sufficient to ensure an efficient tensioning of the contours 101, 102, of the different flexible tension members from 105 to 111 and of the flexible nets 201, 202.

For example, a number of three actuators has proved to be sufficient.

Indeed, the applicant has designed and tested a small scale structure according to the invention, in which three actuators distributed at regular intervals around the longitudinal axis of the structure have proved to be efficient enough. It means that the actuators were separated from each other from a peripheral angle of 120°.

In the tests performed, the actuation was carried out on diagonal cables but, other cables may have been chosen.

Moreover, it should be noted that more than three actuators may be employed to improve safety.

The two phases of deployment of the support structure 100 described here above is preferential.

However, we may envisage a simpler design for the deployment sequence, so that the second phase is not carried out. To that extent, suitable sizing of compression springs 113 within compression members of FIG. 5 would provide enough energy to achieve required pre-tensioning at the end of deployment of the first phase.

Another important aspect in the deployment of electromagnetic reflectors is related to the interface between its support structure 100 and the spacecraft.

Generally, a long deployable boom is foreseen to bring the structure comprising the reflector at a given distance from the spacecraft to avoid any issue during the deployment of said structure. In the particular case where the support structure has the shape of a ring, the boom of the spacecraft is generally attached to at least one contour of the support structure.

However, the invention proposes a specific attachment means between the boom 400 of the spacecraft 500 and the support structure 100 according to the invention.

Figure 6:
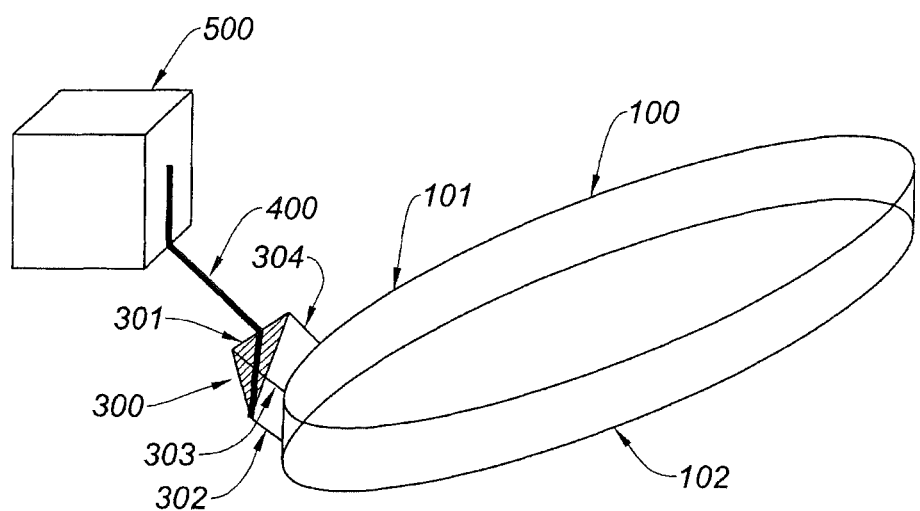
FIG. 6 shows a spacecraft, a boom attached to said spacecraft and an attachment means of said boom to the support structure shown in FIGS. 1 and 2, said attachment means comprising a plurality of hinged bars attached to said support structure.
Figure 7:
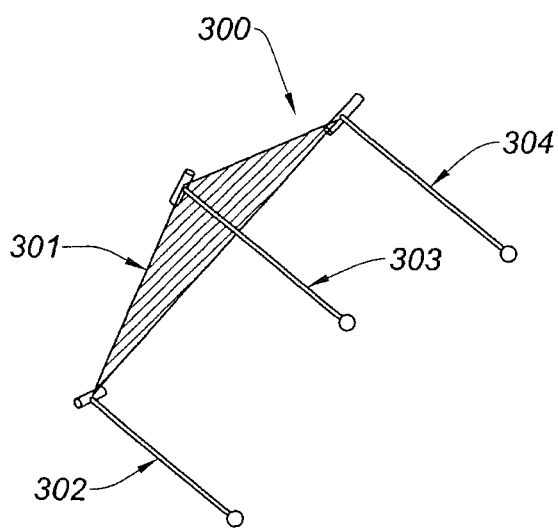
FIG. 7 is a perspective view of the plate comprising the plurality of hinged bars shown on FIG. 6.

FIGS. 6 and 7 shows such an attachment means, in operation in FIG. 6 and remote in FIG. 7.

This attachment means is more specifically directed to electromagnetic wave reflectors when used in an "off-set" type of antenna optical configuration, namely when the reflector ring is attached to the spacecraft boom by one side only.

The attachment means is a device 300 comprising a plate 301 intended to be fixed on the boom 400 of the spacecraft 500 and, a plurality of rigid bars 302, 303, 304 intended to be connected to respective ends of compression members of the support structure 100.

The rigid bars are hinged on the plate 301 by first ends, so that a rotation movement of said rigid bars 302, 303, 304 is possible with respect to the plate 301.

The other ends of the rigid bars 301, 302, 303 comprise revolute joints to be mounted on the ends of the compression members, so that a rotation movement in three directions is possible with respect to these compression members.

As shown in FIG. 7, three hinged bars 301, 302, 303 may be sufficient to ensure a proper deployment of the support structure 100. It is particularly interesting when the plate 301 has a triangular shape, as each rigid bar 302, 303, 304 may be hinged at the level of a corner of the plate 301.

However, the plate 301 may have another shape, provided that three attachment points are provided.

Indeed, a plate with three hinged bars mounted with revolute joints on three respective ends of compression members provides an iso-static structure which is particularly suitable for obtaining a support structure/reflector with a transversal symmetry plane.

In practice, two 303, 304 hinged bars will be mounted on a first contour 101 and the last one 302 on the other contour 102.

In an alternative embodiment, it is possible to have a boom 400' comprising a central trunk 401' connected to the spacecraft 500 and a plurality of branches 402', 403', 404' all fixed, on the one hand, to the central trunk 401', and each hinged with a revolute joint to a corresponding end of a compression member belonging to the support structure 100.

Figure 8:
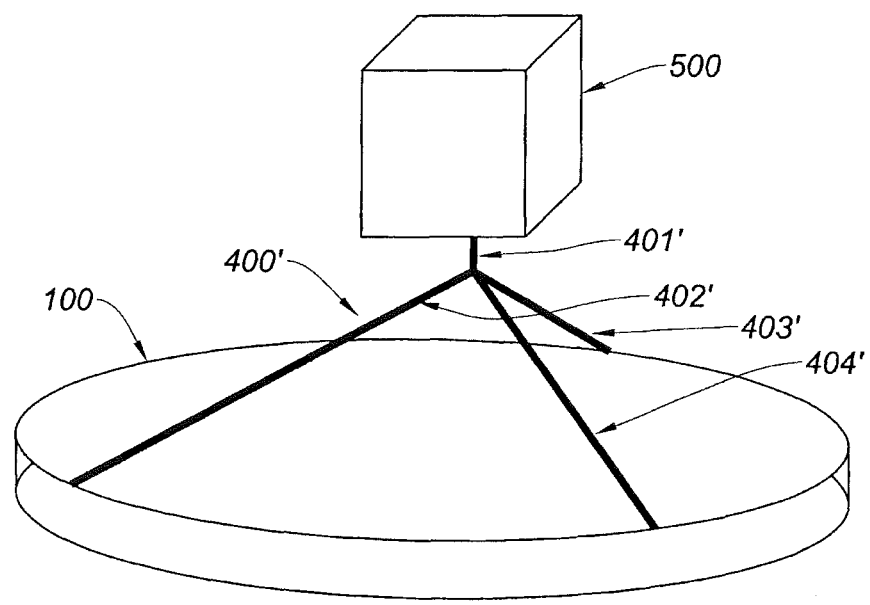
FIG. 8 shows an alternative embodiment to attach the spacecraft to the structure according to the invention

FIG. 8 shows such an alternative.

This alternative is more specifically directed to sunshields or solar sailing applications.

As can be seen in this figure, the spacecraft 500 is located above the support structure 100 so that the boom 400' extends downwards with respect to the spacecraft 500.

The different branches, in that case three branches 402', 403', 404', are distributed at regular intervals around the longitudinal axis of the central trunk 401'. It means that the branches 402', 403', 404' are separated from each other from a peripheral angle of 120°.

In that case, the deployment of the support structure 100 is carried out in a radial direction, in plane located below the spacecraft 500 and the boom 400'.

A convenient deployment is thus obtained.

The tensegrity deployable structure according to the invention may be used in connection with many types of reflectors, among which an antenna.

It may also be used in connection with a sunshield, a solar sail or any large surface useful for collection of radiofrequency.

Other applications such as generating air-drag for re-entry of the spacecraft in the atmosphere may also be considered.

In addition, terrestrial applications are possible.

For example, the invention may find application for temporary or portable shelters or tents.

According to another example, the invention may find an application for aquaculture.

For terrestrial applications, it should be noted that the deployment phase may be limited to the first phase, as the pre-tensioning of the support structure to a required value is not generally as much important as for space applications, in which the shape of the reflector has to be precisely controlled. Moreover, the nets 201, 202 will not generally be envisaged.

Whatever the application, the invention proposes a tensegrity deployable structure which is light, stable and reliable, especially when its deployment is considered.

Moreover, in space applications, the structure according to the invention can be stowed in the envelope of a space launcher.

The invention claimed is:

1. A deployable tensegrity structure comprising, in the deployed state, a support structure forming a ring, shaped around a longitudinal axis and comprising:
    a first flexible tension member defining a first contour of said ring and a second flexible tension member defining a second contour of said ring;
    a first plurality of rigid compression members extending between said first and second contours, one end of each rigid compression member of the first plurality of rigid compression members being mounted on the first contour whereas the other end is not mounted on a said first or second contour; and
    a second plurality of rigid compression members extending between said first and second contours, one end of each rigid compression member of the second plurality of rigid compression members being mounted on the second contour whereas the other end is not mounted on a said first or second contour; said first and second plurality of rigid compression members being arranged with a repetitive crossing pattern around the ring;
    a first plurality of flexible tension members, each flexible tension member of the first plurality of flexible tension members linking each end of a rigid compression member of the first and second plurality of rigid compression members mounted on one of said first and second contours to an end of another rigid compression member of the first and second plurality of rigid compression members which is not mounted on one of said first and second contours and, a second plurality of flexible tension members, each flexible tension member of the second plurality of flexible tension members linking each end of a rigid compression member of the first and second plurality of rigid compression members which is not mounted on one of said first and second contours to an end of another rigid compression member of the first and second plurality of rigid compression members which is also not mounted on one of said first and second contours.

2. The deployable tensegrity structure according to claim 1, wherein the first plurality of flexible tensions members comprises first flexible tension members which link rigid compression members belonging to the same first or second plurality of rigid compression members.

3. The deployable tensegrity structure according to claim 1, wherein the first plurality of flexible tension members comprises second flexible tension members which link rigid compression members of the first plurality of rigid compression members to rigid compression members of the second plurality of rigid compression members.

4. The deployable tensegrity structure according to claim 1, wherein the second plurality of flexible tension members link rigid compression members of the first plurality of rigid compression members to compression members of the second plurality of rigid compression members.

5. The deployable tensegrity structure according to claim 1, wherein several of the first and second plurality of rigid compression members comprise a means for varying the length of at least one flexible tension member of the first and second plurality of flexible tension members.

6. The deployable tensegrity structure according to claim 1, wherein said first and second plurality of rigid compression members comprise a device for locking at least one flexible tension member of the first and second plurality of flexible tension members.

7. The deployable tensegrity structure according to claim 1, wherein two flexible nets are mounted all around first and second contours of the support structure, said nets being linked together by a plurality of linking members so that the nets have both a concave shape and are disposed symmetrically with respect to a transversal symmetric plane of the support structure.

8. The deployable tensegrity structure according to claim 1, wherein the plurality of first and second rigid compression members are bars or struts.

9. The deployable tensegrity structure according to claim 1, wherein the flexible tension members are cables or tendons.

10. The deployable tensegrity structure according to claim 1, wherein said deployable tensegrity structure is provided with at least two active actuators for pre-tensioning the support structure to a required value.

11. The deployable tensegrity structure according to claim 10, wherein said deployable tensegrity structure is provided with three active actuators for pre-tensioning the support structure, said active actuators being distributed at regular intervals around the longitudinal axis of said support structure.

12. A combination of the deployable tensegrity structure according to claim 1 with a device comprising:
    a plate intended to be mounted on a boom of a spacecraft;

a plurality of bars which first ends are hinged on the plate and which second ends comprise revolute joints mounted on respective ends of rigid compression members of the first and second plurality of rigid compression members of the support structure.

13. The combination according to claim 12, wherein two bars of said plurality of bars are mounted on ends of rigid compression members of the first and second plurality of rigid compression members which are mounted on one of the first and second contours, a third bar of said plurality of bars being mounted on an end of another rigid compression member of the first and second plurality of rigid compression members, the another rigid compression member mounted on the other of the first and second contours.

14. A combination of the deployable tensegrity structure according to claim 1 with a boom of a spacecraft, said boom comprising a central trunk and three branches which are fixed on the central trunk and arranged at regular intervals around the longitudinal axis of the trunk, said branches being intended to be hinged on ends of rigid compression members of the first and second plurality of rigid compression members of the support structure.

15. The deployable tensegrity structure according to claim 5, wherein the means for varying the length of at least one flexible tension member is a spring.

\* \* \* \* \*